(12) United States Patent
Baba et al.

(10) Patent No.: US 11,175,249 B2
(45) Date of Patent: Nov. 16, 2021

(54) PHYSICAL PROPERTY VALUE MEASUREMENT DEVICE, PHYSICAL PROPERTY VALUE MEASUREMENT METHOD, AND RECORDING MEDIUM

(71) Applicant: NETZSCH Japan K.K., Yokohama (JP)

(72) Inventors: Takahiro Baba, Tsukuba (JP); Tetsuya Baba, Moriya (JP)

(73) Assignee: NETZSCH Japan K.K., Yokohama (JP)

(*) Notice: Subject to any disclaimer, the term of this patent is extended or adjusted under 35 U.S.C. 154(b) by 0 days.

(21) Appl. No.: 16/620,294

(22) PCT Filed: Mar. 27, 2018

(86) PCT No.: PCT/JP2018/012324
§ 371 (c)(1),
(2) Date: Dec. 6, 2019

(87) PCT Pub. No.: WO2019/092898
PCT Pub. Date: May 16, 2019

(65) Prior Publication Data
US 2021/0080415 A1   Mar. 18, 2021

(30) Foreign Application Priority Data

Nov. 7, 2017  (JP) .............................. JP2017-215004

(51) Int. Cl.
*G01N 25/18*   (2006.01)
(52) U.S. Cl.
CPC .................................. *G01N 25/18* (2013.01)
(58) Field of Classification Search
CPC ........ G01N 25/18; G01N 25/00; G01N 25/20; G01R 31/2656; G01R 23/16; G06F 17/10
See application file for complete search history.

(56) References Cited

U.S. PATENT DOCUMENTS 3,526,761 A * 9/1970 Smith .................... G06G 7/625
                                                    702/109
5,667,300 A * 9/1997 Mandelis ............... G01N 25/18
                                                    257/E21.53

(Continued)

FOREIGN PATENT DOCUMENTS

JP        3252155        1/2002
JP     2002-122559       4/2002

(Continued)

OTHER PUBLICATIONS

International Search Report dated Jun. 26, 2018 in corresponding International PCT Patent Application No. PCT/JP2018/012324, 3 pages.

*Primary Examiner* — Stephanie E Bloss
(74) *Attorney, Agent, or Firm* — Whitmyer IP Group LLC

(57) ABSTRACT

This physical property value measurement device irradiates a specimen with a heating beam arrived at through intensity-pulse modulation of output light of a heating laser and irradiates the specimen with a temperature probe beam that is output light from a temperature probe laser and is delayed relative to the heating beam. The component of a detection signal for the reflected light of the temperature probe beam that is synchronous with the frequency of the intensity-pulse modulation is amplified using a lock-in amplifier, and a computer that performs regression analysis on the thermoreflectance signal obtained from the lock-in amplifier. A thermophysical property value is determined by using a theoretical formula of a transfer function that is a Laplace transform in relation to time of a response function by single pulse heating to perform regression analysis on Fourier coefficients obtained when the detection signal for the reflected light of the temperature probe beam is expanded into a Fourier series in relation to time.

7 Claims, 7 Drawing Sheets

(56) References Cited

U.S. PATENT DOCUMENTS

| | | | | |
|---|---|---|---|---|
| 2002/0011852 | A1* | 1/2002 | Mandelis | G01R 31/311 |
| | | | | 324/750.02 |
| 2002/0080850 | A1* | 6/2002 | Baba | G01N 25/18 |
| | | | | 374/43 |
| 2003/0065461 | A1* | 4/2003 | Yoon | G01R 27/02 |
| | | | | 702/76 |
| 2003/0202556 | A1* | 10/2003 | Taketoshi | G01N 25/72 |
| | | | | 374/45 |
| 2004/0079886 | A1* | 4/2004 | Opfermann | G01N 25/18 |
| | | | | 250/341.6 |
| 2011/0176714 | A1* | 7/2011 | Salomir | G01R 33/4804 |
| | | | | 382/131 |
| 2016/0109393 | A1* | 4/2016 | Mandelis | G01N 29/343 |
| | | | | 73/606 |

FOREIGN PATENT DOCUMENTS

| | | |
|---|---|---|
| JP | 2003-322628 | 11/2003 |
| JP | 2007-279060 | 10/2007 |
| JP | 2009-68904 | 4/2009 |
| JP | 2009-68909 | 4/2009 |

\* cited by examiner

PHYSICAL PROPERTY VALUE MEASUREMENT DEVICE, PHYSICAL PROPERTY VALUE MEASUREMENT METHOD, AND RECORDING MEDIUM

BACKGROUND

1. Field of the Disclosure

The present disclosure relates to a physical property value measurement device, a physical property value measurement method, and a program for a measuring physical property value including that of a thermophysical property.

2. Discussion of the Background Art

Methods for measuring a physical property value can be broadly classified into "steady-state methods" for measuring a temperature distribution or a flow of heat of a subject that is in a steady state and "unsteady state methods" for applying an input of light or the like onto the subject in a pulsed manner or periodic manner and calculating the physical property value based on the response. One of the inventors of the present disclosure proposed a method for obtaining a thermophysical property value of a thin film based on a signal using a thermoreflectance method after heating by a picosecond pulsed beam, as an ultra-fast method among unsteady state methods for measuring thermophysical properties in thin films (for example, see Patent Literature 1). The thermoreflectance method is a method for obtaining temperature changes based on temporal changes of the intensity of reflected light of the beam that irradiated a material face.

In Patent Literature 1, a thin film deposited on a transparent substrate is heated by a picosecond pulse beam from an interface side of the substrate. Patent Literature 1 indicates an analysis result of a signal measured, by the thermoreflectance method, of the change in temperature of a thin film face opposite to the heating face. The analysis of the signal is performed regarding the movement of thermal energy in the metal thin film of tens of nanometers to 200 nm by the response function which is a theoretical formula that solves a thermal diffusion equation under a condition of one-dimensional thermal diffusion after pulse heating based on a classical thermal diffusion equation. The thermoreflectance method enables more ultra-fast observation of the change in temperature at the same position of the thin film face after the heating of the thin film face. Among the signals (referred to as thermoreflectance signals) of the temporal change of the intensity of the reflected light of the temperature probe beam after the pulse heating, the signals in a range no greater than 5 ns are fit by the response function.

In Patent Literature 1, one of the inventors of the present disclosure presented a method for controlling the time difference that heating pulse beam and the temperature probe pulse beam arrive at the specimen by taking advantage of the fact that the speed of light is finite and changing the relative distance from the light source of the heating pulse beam and the measurement pulse beam to the specimen. In doing so, the temporal change of temperature after repetition pulse heating is measured. With this technique, it is extremely difficult to perform optical adjustment when the optical path difference is 1 m (handles 3.3 ns as the time difference) or greater, it was difficult to expand the range of the measurement time any further.

In order to overcome this restriction, one of the inventors of the present disclosure devised and implemented a method, using two independent mode-locked pulse lasers as the heating pulse beam and the measurement pulse beam, causing the lasers to oscillate synchronously, and controlling the delay time of synchronization by delaying the electrical signals. This method enabled observation of a temperature response signal for the entirety of the cycle of repetition pulse heating (Patent Literature 2).

Due to the method of Patent Literature 2, the thermoreflectance signal of a single pulse with respect to a submicron specimen with a thickness of tens of nanometers became observable for the entirety of a single cycle (approximately 13 ns) until time at which the next pulse is to be emitted.

The thermoreflectance signal observed in this manner for a single cycle is analyzed by converting temperature response curve based on periodic repetition pulse heating into a temperature response curve based on single pulse heating (Patent Literature 3). Specifically, correction was performed by subtracting linearly temperature-decaying components from the temperature response curve of the actual measurement.

CITATION LIST

Patent Literature

Patent Literature 1: Japanese Patent No. 3252155
Patent Literature 2: Unexamined Japanese Patent Application Kokai Publication No. 2003-322628
Patent Literature 3: Unexamined Japanese Patent Application Kokai Publication No. 2009-68909

SUMMARY

In the analysis method described in Patent Literature 1, the function representing the temperature distribution that changes with time can be obtained as a solution of a diffusion equation that is a type of a partial differential equation. In a case where thermal diffusion occurs across two different materials such as a thin film and a substrate, the theoretical formula of the response function representing the temperature distribution that changes with time is a complex formula. After the theoretical formula of the transfer function, which is a Laplace transform of the response function is obtained, the theoretical formula of the response function is obtainable for the first time by inverse-Laplace transforming the transfer function. It was necessary to use the response function of the time domain obtained in this manner to perform regression analysis on the thermoreflectance signal observed in the time domain.

Normally, in a Laplace space, a transfer function can be expressed as a theoretical formula even with respect to a complex intended subject in which a multi-layer thin film is deposited on a substrate and an interface thermal resistance exists therebetween. However, a theoretical formula of a complex transfer function cannot necessarily be inverse-Laplace transformed. In particular, the inverse-Laplace transform of the theoretical formula of a transfer function of a specimen having a thin film of two or more layers deposited on a substrate could not be achieved.

The response function expressing the temperature response after single pulse heating is defined by a time range from 0 to ∞. With respect to this, a picosecond or nanosecond heating pulse beam for observing the thermoreflectance signal is emitted repetitiously at a fixed cycle instead of as a single pulse, and thus a signal with sufficient signal/noise (S/N) ratio can be observed for the first time. Therefore, there is a deviation between the response signal after single pulse heating and the response signal of the repetition pulse heating.

Since the theoretical formula is calculated by assuming the temperature response after single pulse heating, it is critically important to convert the temperature response obtained after repetition pulse heating into the temperature response obtained after single pulse heating and then perform regression analysis. Therefore, in Patent Literature 3, a correction is performed to subtract the linearly temperature-decaying components from the temperature response curve actually measured through repetition heating, and regression analysis is performed in an effective time domain for that correction. Since these methods perform analysis using approximations that are not exact, it is critically important to carefully verify the effective range of the approximations. As such, these methods fall short of performing systematic evaluations.

The present disclosure is made with the view of the above situations, and an objective of the present disclosure is to provide a physical property value measurement device and the like that can accurately measure a physical property value regardless of the layered structure of the subject to be measured.

In order to achieve the aforementioned objective, a physical property value measurement device according to a first aspect of the present disclosure includes:

an input applier to apply an input of repetition pulse heating to a subject;

a response signal acquirer to acquire a response signal generated at the subject; and a physical property value calculator to calculate a physical property value by performing regression analysis on Fourier coefficients obtained when the response signal acquired by the response signal acquirer is expanded into a Fourier series in relation to time, using a theoretical formula of a transfer function that is a Laplace transform in relation to time of the response function by single pulse heating.

The physical property value calculator may calculate the physical property value by performing regression analysis, in a frequency range from a frequency of a repetition pulse interval to a sampling frequency, on the Fourier coefficients obtained when the response signal acquired by the response signal acquirer is expanded into the Fourier series across an entire domain of a single cycle of repetition pulse heating The input applier may irradiate the subject with a heating beam that is a repetition pulse beam, the response signal acquirer may acquire a temperature response signal based on light that is reflected when a temperature probe beam, having a delay relative to the heating beam, irradiates the subject, the temperature probe beam being a repetition pulse beam of a same cycle as the heating beam, and the physical property value calculator may calculate a thermophysical property value including a thermal diffusivity, a thermal effusivity, or an interface thermal resistance of the subject by performing the regression analysis on the Fourier coefficients obtained when the temperature response signal is expanded into the Fourier series in relation to time, by using the theoretical formula of the transfer function that is the Laplace transform in relation to time of the response function after single pulse heating.

The input applier may irradiate the subject with the heating beam, the heating beam being intensity-pulse modulated to the repetition pulse beam, and the response signal acquirer may acquire, as the temperature response signal, a signal obtained by amplifying a component that is synchronous with a frequency of the intensity-pulse modulation, the signal being included in a signal obtained by photoelectric conversion of light reflected when the temperature probe beam irradiated the subject The subject may include a substrate and a thin film deposited on the substrate, and a temporal change of a temperature distribution of the subject may be calculated based on a result of the regression analysis performed using the theoretical formula of the transfer function that is the Laplace transform in relation to time of the response function by single pulse heating, and the result is displayed, as a three-dimensional graph, with a position in a through-thickness direction of the thin film and the substrate, temperature, and time, on three axes.

A physical property value measurement method according to a second aspect of the present disclosure comprises:

an input application step of applying a repetition pulse-type input to a subject;

a response signal acquisition step of acquiring a response signal that is generated at the subject; and a physical property value calculation step of calculating a physical property value by performing regression analysis on Fourier coefficients obtained when the response signal, acquired in the response signal acquisition step, is expanded into a Fourier series in relation to time, using a theoretical formula of a transfer function that is a Laplace transform in relation to time of the response function by single pulse heating.

A program according to a third aspect of the present disclosure causes a computer to function as:

a response signal acquirer to acquire a response signal that is generated at a subject when a repetition pulse-type input is applied to the subject; and a physical property value calculator to calculate a physical property value by performing regression analysis on Fourier coefficients obtained when the response signal acquired by the response signal acquirer is expanded into a Fourier series in relation to time, using a theoretical formula of a transfer function that is a Laplace transform in relation to time of the response function by single pulse heating.

Advantageous Effects of Invention

The present disclosure enables accurate measurement of a physical property value regardless of the layered structure of the subject to be measured.

DETAILED DESCRIPTION OF THE PREFERRED EMBODIMENT

Embodiment

Figure 1:
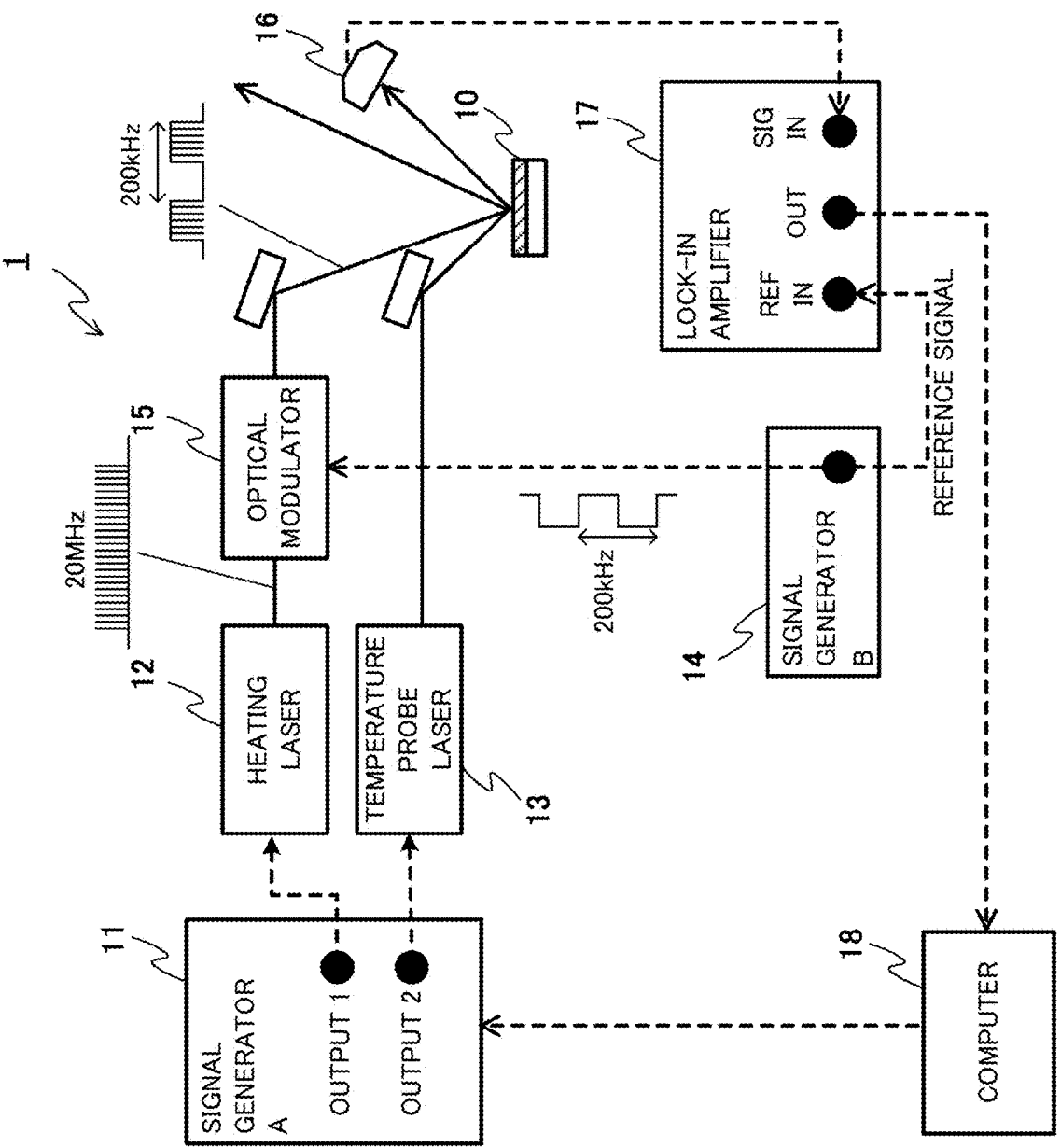
FIG. 1 is a diagram illustrating a configuration of a physical property value measurement device according to an embodiment of the present disclosure.

The embodiment of the present disclosure is described in detail with reference to the drawings. FIG. 1 is a diagram illustrating a configuration of a physical property value measurement device 1 according to the embodiment. In the present embodiment, the physical property value measurement device 1 measures a temperature response by using the thermoreflectance method for irradiating a front face or rear face of a specimen 10 with a pulse beam and detecting reflected light of the temperature probe beam with which the front face was irradiated.

The physical property value measurement device 1 includes, as illustrated in FIG. 1, a signal generator A 11 that outputs a drive signal of a laser, a heating laser 12 that outputs a heating beam to heat up the specimen 10, and a temperature probe laser 13 that outputs a temperature probe beam for detecting a temperature. The physical property value measurement device 1 also includes a signal generator B 14 for generating an electrical signal for intensity-pulse modulating the heating beam, and an optic modulator 15 that intensity-pulse modulates the heating beam in accordance with the electrical signal. The physical property value measurement device 1 further includes a differential detector 16 that detects the difference in intensity between the reflected light of the temperature probe beam with which the specimen 10 was irradiated and a reference beam that is a sampling of a portion of the temperature probe beam, and a lock-in amplifier 17 that amplifies components, of the modulation frequency of the optic modulator 15, included in the detection signal of the differential detector 16. The physical property value measurement device 1 further includes a computer 18 that calculates a physical property value by using a theoretical formula of a transfer function in performing regression analysis on the output signal of the lock-in amplifier 17. In other words, the physical property value measurement device 1 includes (i) an input applier that includes the signal generator A 11 and the heating laser 12, (ii) a response signal acquirer that includes the differential detector 16, and (iii) a physical property value calculator that includes the computer 18.

Figure 2A:
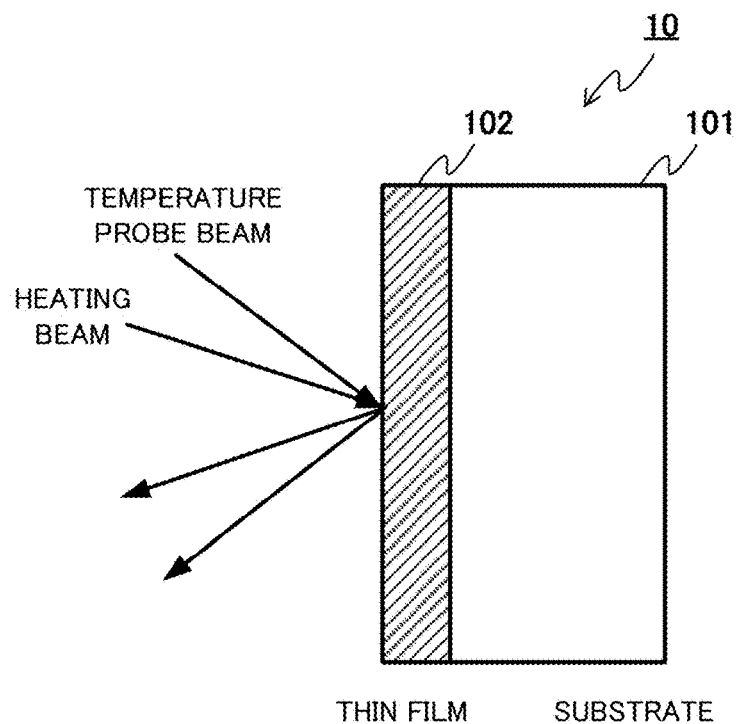
FIG. 2A is a diagram illustrating a specimen being irradiated with a heating beam and a temperature probe beam in an FF arrangement.
Figure 2B:
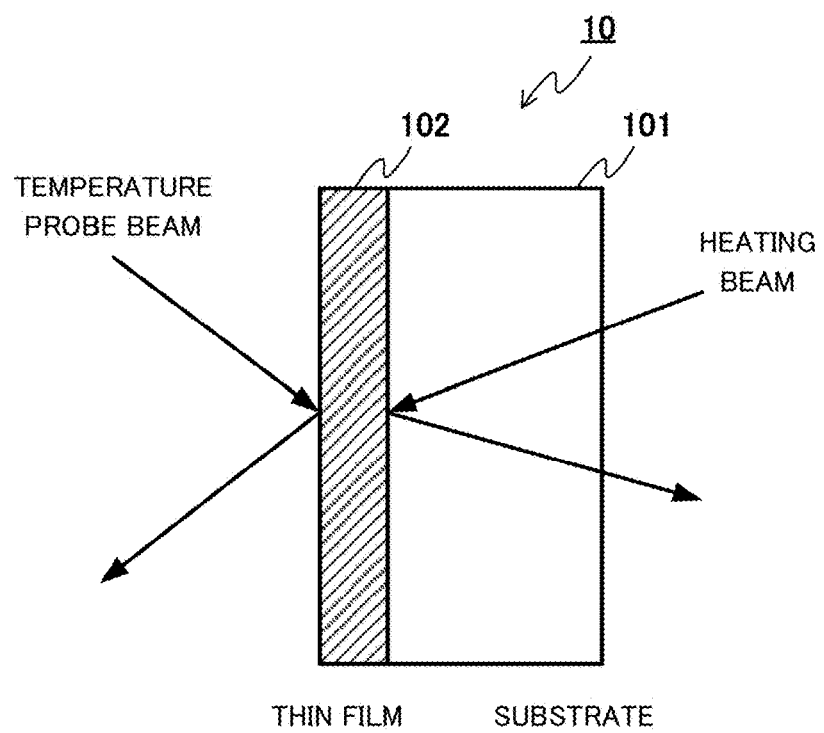
FIG. 2B is a diagram illustrating the specimen being irradiated with the heating beam and the temperature probe beam in an RF arrangement.

The specimen 10 is a subject for which a physical property value is to be measured. FIG. 2A and FIG. 2B are diagrams illustrating the specimen 10 being irradiated with a heating beam and a temperature probe beam. In the present embodiment, the specimen 10, as illustrated in FIGS. 2A and 2B, is constituted by a substrate 101 and a thin film 102 deposited on the substrate 101. The physical property value measurement device 1 measures a thermophysical property value of the thin film 102. The physical property value measurement device 1, as illustrated in FIG. 2A, may irradiate the front face of the thin film 102 of the specimen 10 with a heating beam and perform measurement in a front face heating/front face measurement (FF: Front heating/Front detection) arrangement. As illustrated in FIG. 2B, the physical property value measurement device 1 may instead (i) irradiate the rear face, being the interface between the substrate 101 and the thin film 102 of the specimen 10, with the heating beam and (ii) perform measurement in a rear face heating/front face measurement (RF: Rear heating/Front detection) arrangement. FIG. 1 illustrates a FF arrangement configuration.

The signal generator A 11 outputs electrical signals for causing pulse beams to be outputted to the heating laser 12 and the temperature probe laser 13. The pulse width of the pulse beam emitted by the heating laser 12 and the pulse beam emitted by the temperature probe laser 13 are approximately 0.5 ps alike and the repetition cycle for either of the pulse beams is 50 ns. The electrical signal that is outputted by the signal generator A 11 is generated at a frequency of 20 MHz in accordance with the repetition cycle. The time at which the electrical signal to be input to heating laser 12 is generated and the time at which the electrical signal to be input to the temperature probe laser 13 is generated by the signal generator A 11 can be controlled in a time period of one cycle. Such control can be performed by using the settings panel of the signal generator A 11 or the computer 18 which is externally connected.

The heating laser 12 and the temperature probe laser 13 both are fiber lasers that output pulse beams having widths of 0.5 ps based on the electrical signals respectively received from the signal generator A 11.

The frequency of the electrical signal generated by the signal generator B 14 is 200 kHz. The electrical signal from the signal generator B 14 is received by the optic modulator 15 and the transmissivity of the output beam of the heating laser 12 is modulated at 200 kHz. As a result, the heating intensity of the specimen 10 is modulated at 200 kHz. At the same time, the electrical signal from the signal generator B 14 is received by the lock-in amplifier 17 and the lock-in amplifier 17 amplifies the signal that is synchronous with the heating intensity modulation of 200 kHz with a superb signal/noise (S/N) ratio.

In the case of the FF arrangement, the heating beam outputted by the optic modulator 15 irradiates the front face of the thin film 102 on the side thereof opposite to the substrate 101 whereas in the case of the RF arrangement, the heating beam outputted by the optic modulator 15 irradiates the rear face being the interface between the base 101 and the thin film 102 of the specimen 10. Also, the temperature probe beam outputted from the temperature probe laser 13 irradiates the front face of the thin film 102 on the side thereof opposite to the substrate 101. The differential detector 16 is a light detector that receives the reflected light of the temperature probe beam outputted from the temperature probe laser 13 and converts the received light into an electrical signal. The differential detector 16 is, for example, a photodiode.

The lock-in amplifier 17 is an amplifier that amplifies a component of a specific frequency included in an input signal. In the present embodiment, the component, included in the signal detected by the differential detector 16, synchronous with a reference signal of 200 kHz, which is the modulation frequency of the optic modulator 15, is amplified and output.

The computer 18 analyzes the signal amplified by the lock-in amplifier 17 and executes processing for calculating the thermophysical property value.

Figure 3:
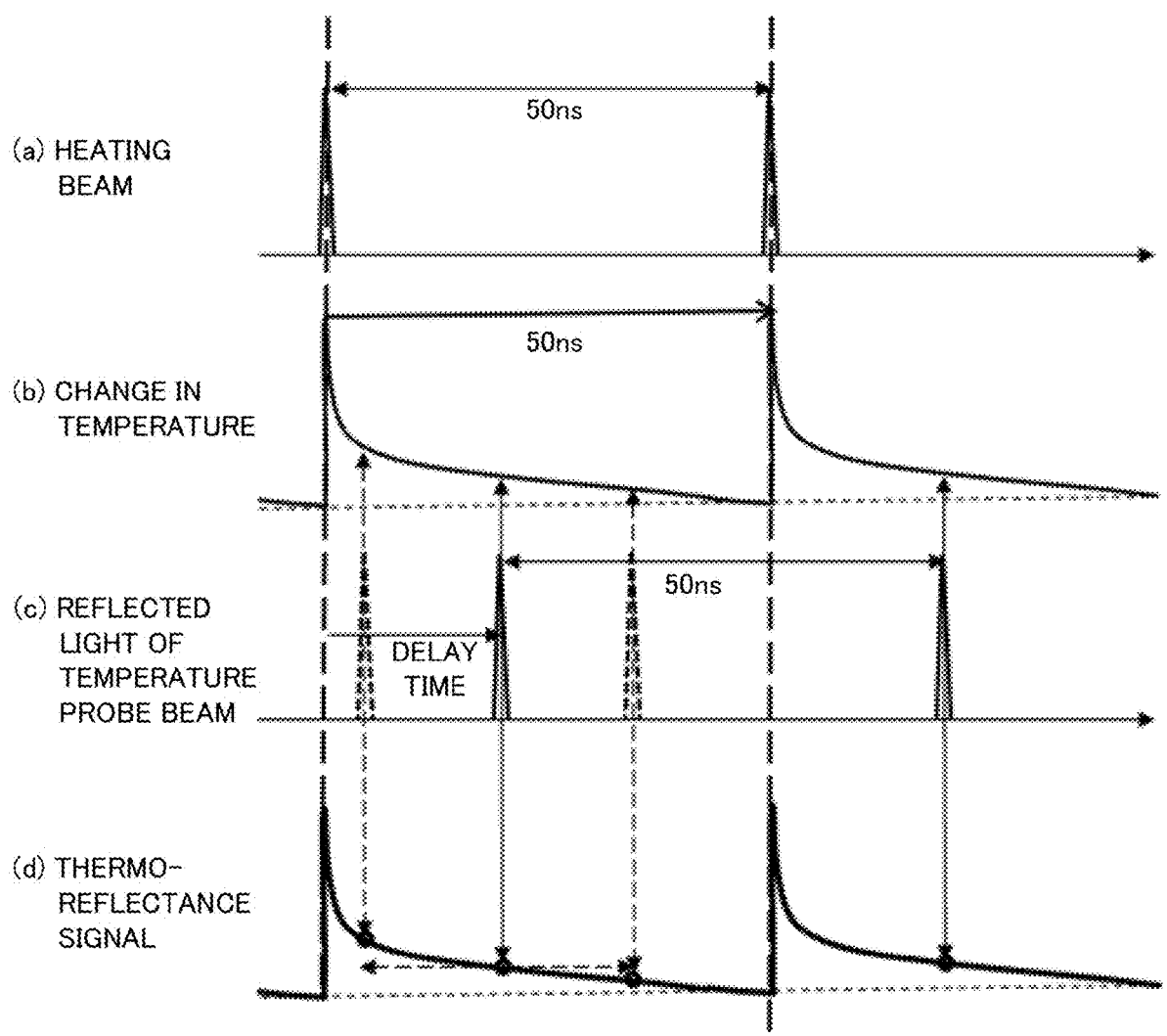
FIG. 3 is a timing chart illustrating the timing of the heating beams, the change in temperature, and the reflected light of the temperature probe beams.

The operations of the physical property value measurement device 1 configured as described above are described with reference to the drawings. FIG. 3 is a timing chart illustrating, in the case of the FF arrangement, the timing of (i) the heating beams, (ii) the change in temperature, and (iii) reflected light of the temperature probe beams.

Electric signals with a repetition cycle of 50 ns are outputted from the first output terminal and the second output terminal of the signal generator A 11. The output signal of the second output has a delay in the oscillation time relative to the output signal of the first output. Due to the electrical signal output from the first output of the signal generator A 11, the heating laser 12 outputs heating beams with a pulse width of 0.5 ps at a repetition cycle of 50 ns.

The heating beam output from the heating laser 12 is intensity-pulse modulated by the optic modulator 15, and, as illustrated in FIG. 2A and FIG. 2B, irradiates the specimen 10, thereby heating the specimen 10. The heating beam output from the optic modulator 15 irradiates the front face of the thin film 102 on the side thereof opposite to the substrate 101 or irradiates the interface between the substrate 101 and the thin film 102. When the heating beam irradiates the front face or the interface, the temperature of the front face or the interface immediately increases, and subsequently the heat diffuses to the inside of the thin film.

Due to the electrical signal output from the second output of the signal generator A 11, the temperature probe laser 13 outputs temperature probe beams, likewise, with a pulse width of 0.5 ps at a repetition cycle of 50 ns. The temperature probe beam is delayed by t-seconds relative to the heating beam. The temperature probe beam, as illustrated in FIG. 2A and FIG. 2B, irradiates the front face of the thin film 102 on the side thereof opposite to the substrate 101. Since the reflectivity of the temperature probe beam is proportional to the change in temperature, the physical property value measurement device 1 observes the change in the front face temperature of the thin film 102 based on the change in reflectivity of the temperature probe beam. The change in temperature caused by a single pulse heating beam is approximately 0.1° C.

Regardless of whether the FF arrangement or the RF arrangement is used, the irradiation position of the heating beam and the temperature probe beam must be coaxial with each other with respect to the creepage direction of the thin film.

The reflected light of the temperature probe beam is received by the differential detector 16 and converted into an electrical signal. The detection signal output by the differential detector 16 is received by the lock-in amplifier 17. Since the change in the reflectivity proportional to the change in temperature (thermoreflectance) is small at approximately one part in one thousand to one part in one hundred thousand, the lock-in amplifier 17 amplifies the component, included in the detected signal, synchronous with the modulation frequency of 200 kHz.

The temperature response with respect to heating by pulse-beam is described with reference to FIG. 3. FIG. 3 is a timing chart illustrating, in the case of the FF arrangement, the timing of (i) the heating beams, (ii) the change in temperature, and (iii) reflected light of the temperature probe beams. Upon irradiating of the front face of the thin film 102 with a pulsed heating beam such as that illustrated in view (a) of FIG. 3, the temperature of the front face of the thin film 102 changes on the same repetition cycle as that of pulsed beam as illustrated in view (b) of FIG. 3. In contrast to this, the temperature probe beam that is a pulse beam on the same repetition cycle, reaches the front face of the thin film 102 t-seconds later. The term "t-seconds" refers to the delay time relative to the heating beam. As such, the temperature probe beam is reflected at a reflectance proportional to the change in temperature t-seconds after the heating by the heating beam, and thus the intensity of the reflected light changes as illustrated in view (c) of FIG. 3.

Furthermore, since the heating beam is also intensity-modulated at 200 kHz, the intensity of the reflected light of the temperature probe beam is also changed at 200 kHz. As the component synchronous with the modulation frequency of 200 kHz, detected by the differential detector 16, is amplified by the lock-in amplifier 17, the S/N ratio can be improved.

The thermoreflectance signal amplified by the lock-in amplifier 17, as illustrated in view (d) of FIG. 3, is sampled after the delay time t is changed. By changing the delay time t within a range of 50 ns, sampling for the entirety of the repetition cycle can be performed. The thermoreflectance signal is the temperature response signal and this signal is transmitted to the computer 18 from the lock-in amplifier 17. The computer 18 measures the thermophysical property value of the thin film 102 by analyzing the received thermoreflectance signal.

The signal observed by the thermoreflectance method is a time response signal. In such a case, the thermophysical property value is typically calculated by performing regression analysis on the thermoreflectance signal using a "response function expressed as a function of time" obtainable as a theoretical solution of a diffusion formula. For the "response function expressed as a function of time" used for this regression analysis, an approximate formula taking into account the interface thermal resistance between a thin film and a substrate is obtained in a case where a single-layered thin film is irradiated with a single pulse. However, a theoretical formula of a temperature response of single pulse heating or repetition pulse heating cannot be obtained in the case of multilayered films with interface thermal resistances between the layers.

In the present disclosure, the computer 18 carries out regression analysis to obtain a thermophysical property value by fitting "a transfer function that is a Laplace transform in relation to time of a response function that is a theoretical formula of a temperature response after single pulse heating" to Fourier coefficients obtained after a thermoreflectance signal obtained by detection of the reflected light of the temperature probe beam is expanded into a Fourier series in relation to time. In doing so, a regression analysis that is based on an exact theoretical formula that takes into account the interface thermal resistance even with respect to a multi-layered film having any number of layers one-dimensionally stacked atop one another on a substrate is realized. Below, the analysis method of the thermoreflectance signal is described in detail.

In the present embodiment a case in which the specimen 10 that is two-layered constituted by the thin film 102 and the substrate 101, for example, as illustrated in FIGS. 2A and 2B measured using the FF arrangement is described. The change in temperature of the heating face (front face) when the front face of the thin film 102 is heated by a single pulse beam can be expressed using a theoretical formula such as in Formula (1) based on a classical thermal diffusion equation. Here, $b_s$ is the thermal effusivity of the substrate 101, bf is the thermal effusivity of the thin film 102, and $\tau_f$ is the thermal diffusion time in the film thickness direction of the thin film. $\tau_f$ is expressed in the following Formula (2) where $d_f$ is the film thickness of the thin film and $k_f$ is the thermal diffusivity in the film thickness direction of the thin film.

(Equation 1)

$$T(t) = \frac{1}{b_t\sqrt{\pi t}}\left(1 + 2\sum_{n=1}^{\infty} \gamma^n \exp\left(-n^2\frac{\tau_f}{t}\right)\right) \quad (1)$$

$$\gamma = \frac{b_f - b_s}{b_f + b_s}$$

(Equation 2)

$$\tau_f = \frac{d_f^2}{k_f} \quad (2)$$

The transfer function obtained as the Laplace transform of Formula (1) is expressed in Formula (3). Here p is the Laplace transform variable.

(Equation 3)

$$\tilde{T}(p) = \frac{1}{b_f\sqrt{p}} \cdot \frac{1 + \gamma \cdot \exp(-2\sqrt{\tau_f p})}{1 - \gamma \cdot \exp(-2\sqrt{\tau_f p})} \quad (3)$$

The change in intensity of the thermoreflectance signal is proportional to the change in temperature. Here, the absolute value of the change in temperature is unnecessary and only the relative change is used for regression analysis.

However, due to the limitations of the S/N ratio, a measureable signal level cannot be obtained by single pulse heating in actual measurements. In order to solve this, the physical property value measurement device 1 obtains a thermoreflectance signal with a sufficient S/N ratio through repetition pulse heating. The thermoreflectance signal observed in this manner is based on the periodic function X(t) which has the same cycle as the repetition cycle ΔT of the heating pulse.

In a case where the thermoreflectance signal is sampled at a constant interval Δt, the signal of N points indicated in Formula (4) is obtained during a single cycle.

(Equation 4)

$$N = \Delta T/\Delta t \quad (4)$$

The signal $x_m$ of N points during a single cycle can be obtained by Formula (5) where the value of m is from m=0 to m=N−1.

(Equation 5)

$$x_m = X(m\Delta t) \quad (5)$$

Since it can be assumed that the thermoreflectance signal is based on periodic function, the frequency corresponding to cycle ΔT of the thermoreflectance signal and the Fourier coefficient with respect to harmonic of the frequency constitute what is necessary as information.

Here, the Fourier coefficient, determined at each frequency $v_n$ of the thermoreflectance signal, is obtained by calculation summing the series of complex exponential functions in a frequency range from the frequency of the repetition pulse interval to the sampling frequency as indicated in Formula (6).

(Equation 6)

$$X_n = \frac{\Delta t}{\Delta T/2}\sum_{m=0}^{N-1} x_m \cdot \exp(-i2\pi v_n \cdot m\Delta t) \quad (6)$$

Frequency: $v_n = \frac{n}{\Delta T}$ (n = 0, 1, 2, ···)

It is necessary to fit a theoretical formula to the Fourier coefficients obtained from the observation data expressed by Formula (6) to determine thermal diffusion time $\tau_f$ of the thin film and the dimensionless number γ defined by the thermal effusivity ratio of the thin film and the substrate. Here, since Formula (1) expresses the temperature response after single pulse heating and Formula (3) expresses the transfer function that is the Laplace transform of Formula (1), Formula (3) cannot be made to be directly associated with Formula (5). Therefore, the computer 18 fits the Formula (8), in which the proportionality constant k(k″=k/bf) is introduced into the transfer function of Formula (3), with the value expressed by Formula (7) as the explanatory variable, to the Fourier coefficients obtained when the thermoreflectance signal by repetitive heating is expanded into a Fourier series.

(Equation 7)

$$p = i2\pi v_n \quad (7)$$

(Equation 8)

$$Y(i2\pi v_n) = k \cdot \tilde{T}(i2\pi v_n) \quad (8)$$

$$= \frac{k''}{\sqrt{i2\pi v_n}} \cdot \frac{1 + \gamma \cdot \exp(-2\sqrt{i2\pi v_n \tau_f})}{1 - \gamma \cdot \exp(-2\sqrt{i2\pi v_n \tau_f})}$$

The aforementioned Formula (8) is for a case where there is no interface thermal resistance between the thin film and the substrate. In the case where interface thermal resistance R between the thin film and the substrate is to be taken into account, the proportionality constant k introduced into the transfer function of Formula (3) is given by the following Formula (9).

(Equation 9)

$$Y(i2\pi v_n) = k \cdot \tilde{T}(i2\pi v_n) \quad (9)$$

$$= \frac{k''}{\sqrt{i2\pi v_n}} \cdot \frac{1 + \dfrac{\gamma + \sqrt{\tau_\gamma \xi}}{1 + \sqrt{\tau_\gamma \xi}} \cdot \exp(-2\sqrt{i2\pi v_n \tau_f})}{1 - \dfrac{\gamma + \sqrt{\tau_\gamma \xi}}{1 + \sqrt{\tau_\gamma \xi}} \cdot \exp(-2\sqrt{i2\pi v_n \tau_f})}$$

$$\tau_\gamma = \left(R \cdot \frac{b_f b_s}{b_f + b_s}\right)^2$$

Since the Fourier coefficient $X_n$ expressed in Formula (6) is a complex number, the computer 18 disregards phase and handles only the absolute value (frequency spectrum). Since Y is also a complex number, the fitting to $X_n$ is performed after finding the absolute value and converting the absolute value into a real-valued function. Therefore, in the case where there is no interface thermal resistance, the thermal diffusion time $\tau_f$ of the thin film 102 and the dimensionless number γ defined by the thermal effusivity ratio of the thin film 102 and the substrate 101 are determined as parameters of the regression analysis.

In the case where the interface thermal resistance R is to be taken into account, likewise, Formula (9) is used to obtain $\tau_f$ and γ as well as $\tau_f$ and calculate the interface thermal resistance R.

The computer 18 displays, on a display, the results of the regression analysis performed by using Formula (8) or Formula (9). Here, the temporal change of the temperature distribution of the thin film and the substrate calculated based on the results of the regression analysis may be displayed on the display. Although various display aspects can be selected, a three-dimensional display with elapsed time after pulse heating on the x-axis, the position in the through-thickness direction of the thin film and the substrate on the y-axis, and the rise in temperature on the z-axis can systematically express the temporal change of the temperature distribution.

As described above, in the present embodiment, the physical property value measurement device 1 irradiates the specimen 10 with the heating beam arrived at through intensity-pulse modulation of the output light of the heating laser 12 and irradiates the specimen 10 with the temperature probe beam, which is an output beam of the temperature probe laser 13, delayed relative to the heating beam. Then, the component, synchronous with the frequency of the intensity-pulse modulation, included in detected signal of the reflected light of the temperature probe beam is amplified by the lock-in amplifier 17 and the obtained thermoreflectance signal is analyzed by the computer 18. Regarding the analysis, the thermophysical property value is obtained by fitting the transfer function, which is the Laplace transform in relation to time of the response function based on a theoretical formula, to Fourier coefficients that are obtained when the detection signal or the reflected light of the temperature probe beam is expanded into a Fourier series in relation to time. In doing so, a regression analysis that is based on an exact theoretical formula that takes into account the interface thermal resistance even with respect to a multi-layered film having any number of layers one-dimensionally stacked atop one another on a substrate is realized, thereby enabling accurate measurement of a physical property value of multi-layer thin film.

Implemented Example

Figure 4:
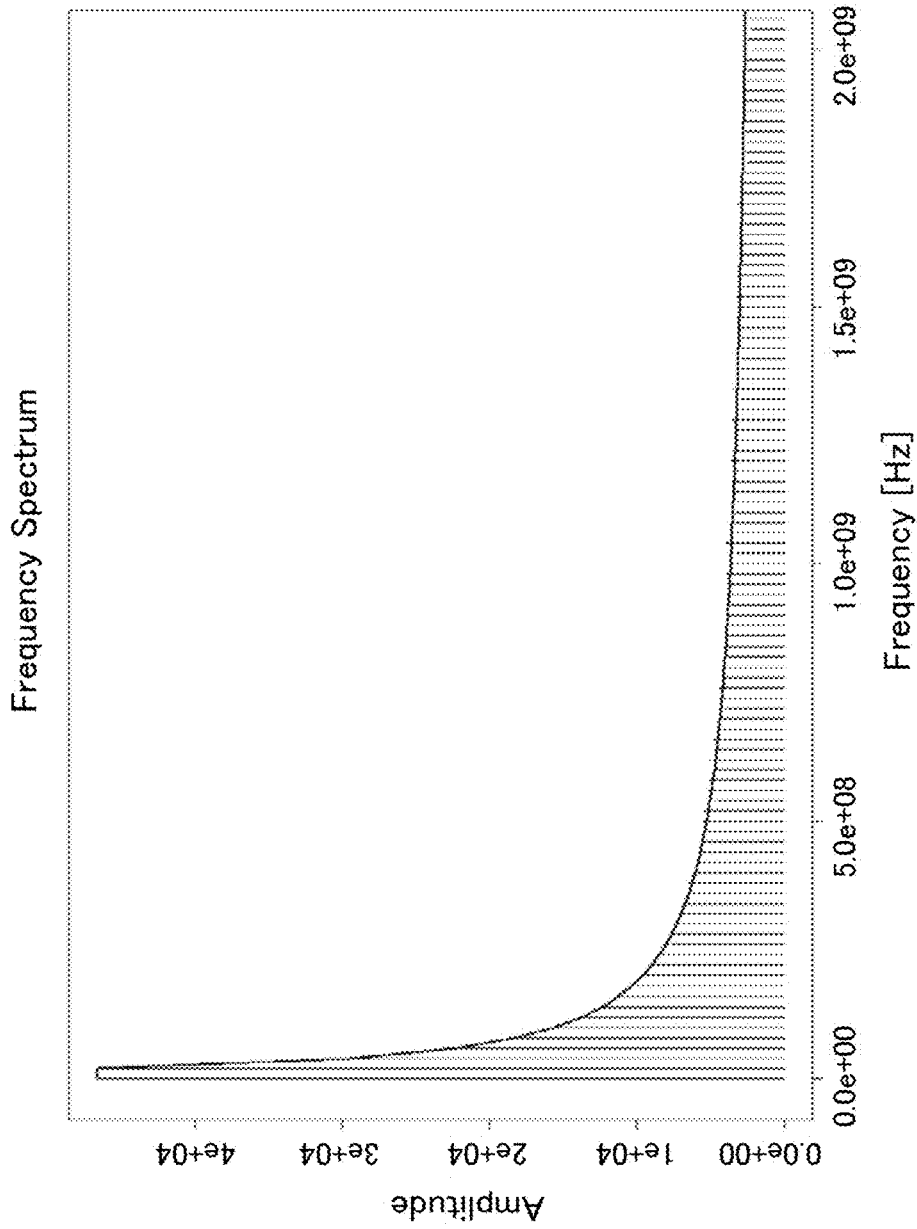
FIG. 4 is a diagram illustrating a result of regression analysis in a frequency domain.
Figure 5:
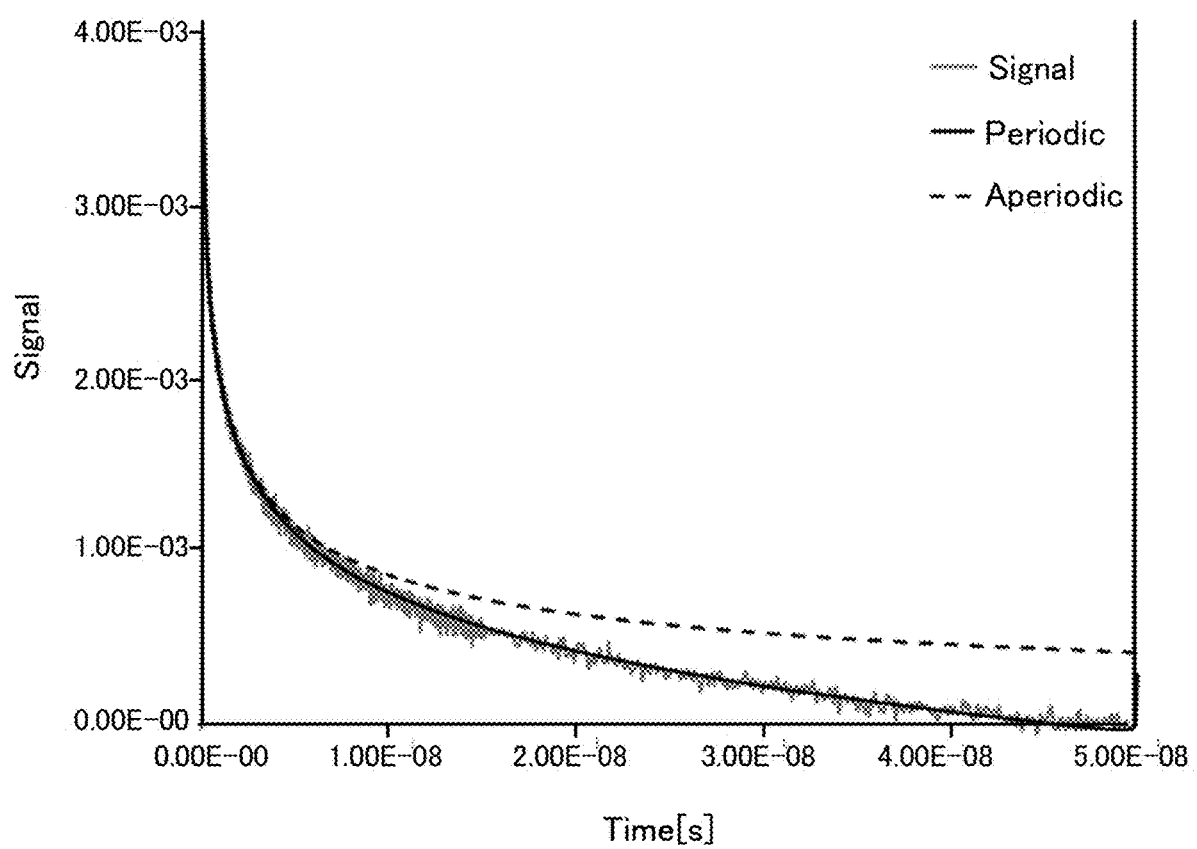
FIG. 5 is a diagram illustrating a result of regression analysis in a time domain.
Figure 6:
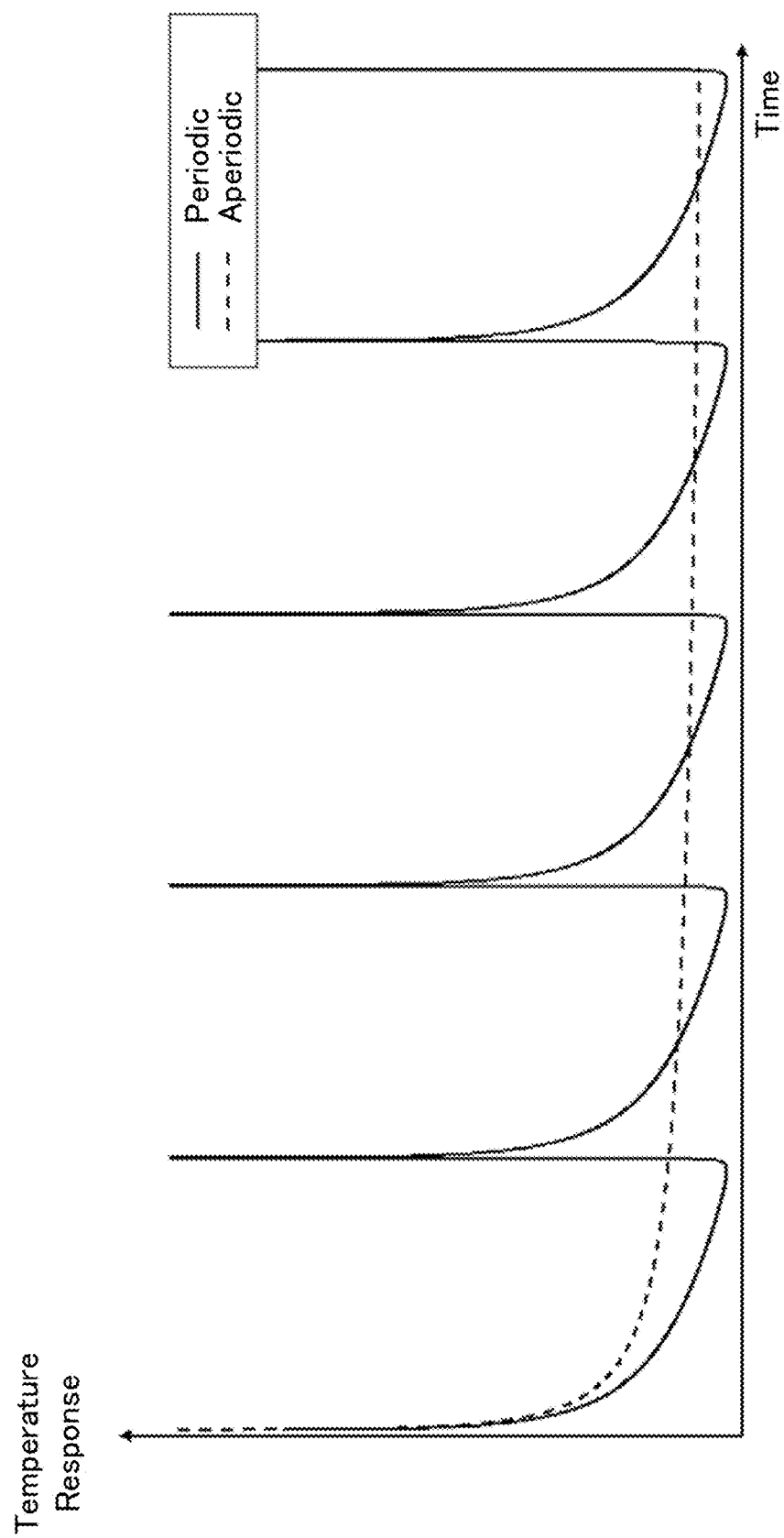
FIG. 6 is a diagram illustrating temperature response trajectories in the case of single pulse heating and repetition pulse heating.
Figure 7:
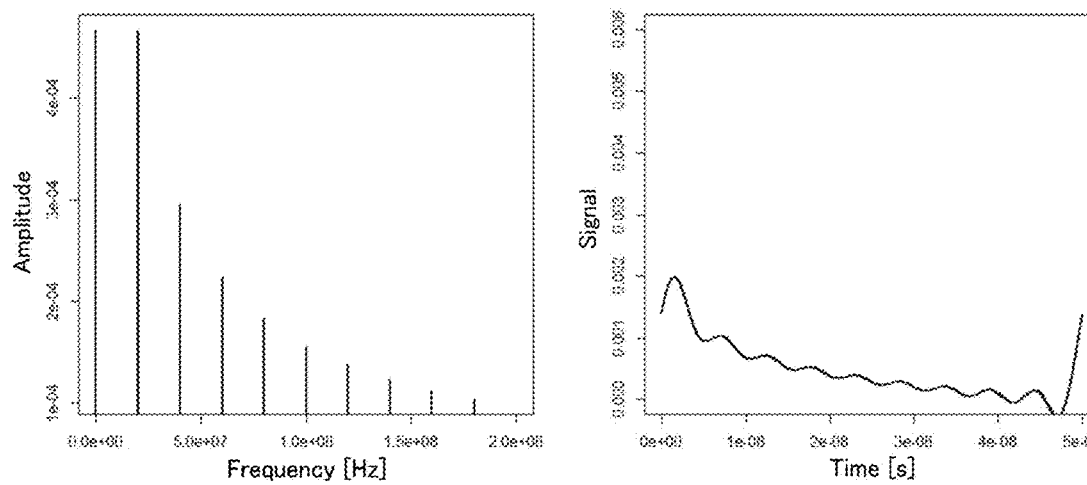
FIG. 7 is a diagram illustrating regression curves for when the number of frequency components are changed.
Figure 7:
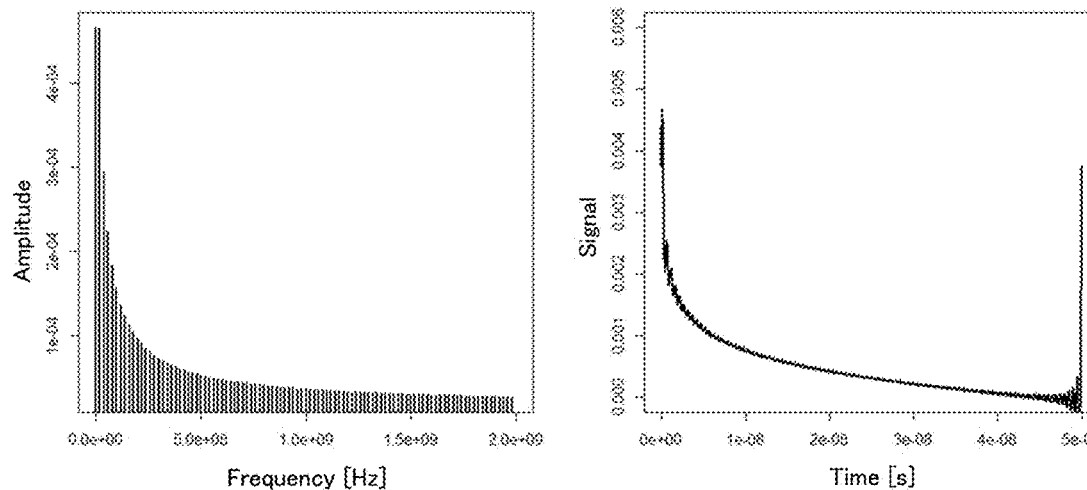
Figure 7:
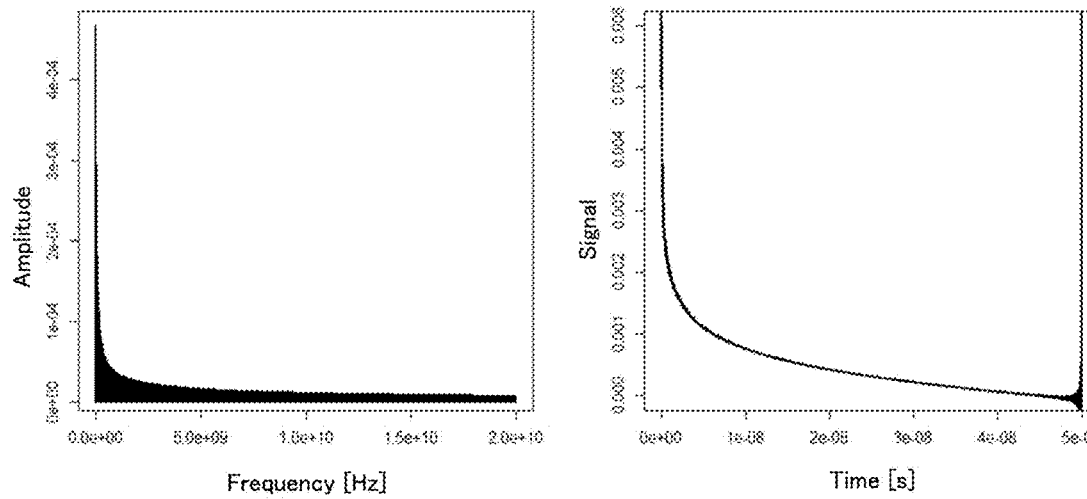

Through use of the physical property value measurement device 1 that includes the configuration illustrated in the embodiment, the computer 18 analyzes the thermoreflectance signal, obtained by irradiating, with the heating beam and the temperature probe beam, a face of the specimen 10 that is the face of the thin film 102 being a dual-layered thin film formed with a titanium nitride thin film on substrate 101 and a molybdenum thin film on the titanium nitride thin film. The analysis result is described with reference to FIGS. 4 to 7. FIG. 4 is a diagram illustrating a result of the regression analysis in a frequency domain whereas FIG. 5 is a diagram illustrating a result of the regression analysis in a time domain. The FIG. 6 is a diagram illustrating temperature response trajectories in the case of single pulse heating and repetition pulse heating. FIG. 7 is a diagram illustrating regression curves for when the number of frequency components are changed.

When the computer 18 performed regression analysis, in the frequency domain with function Y, on the Fourier coefficient $X_n$ obtained from the actual measurement value of the thermoreflectance signal indicating the temperature response, fitting could be performed with high accuracy and the thermophysical property value could be calculated as illustrated in FIG. 4.

Also, the regression curve of the time domain is displayed using Formula (10) below that is the Fourier series with the Fourier coefficients calculated from function Y obtained by the analysis. The first term on the right side corresponds to the offset of the entirety of the signal. As illustrated in FIG. 5, this regression curve matches, in the entire time domain across a single cycle, the actual measurement data of the thermoreflectance signal of the time domain.

(Equation 10)

$$y_m = \frac{X_0}{2} + \sum_{n=1}^{\infty} Y(i2\pi v_n) \cdot \exp(i2\pi v_n \cdot m\Delta t) \tag{10}$$

In FIG. 5, the dashed line represents the temperature response in the time domain after single pulse heating. However, since the thermoreflectance signal after pulse beam heating is extremely weak, it was critically important to improve the S/N ratio by integrating the signal obtained by repetition pulse heating. As a result, there was a difference between the temperature response trajectory expected using conventional analysis with the single pulse heating and the temperature response trajectory observed during the experiment with the repetition pulse heating, as illustrated in FIG. 6.

Therefore, there was a deviation in the latter portion of the repetition cycle between the actual measurement value of the repetition pulse heating and the function used in the conventional regression analysis. However, since the regression analysis on the Fourier coefficients, obtained after expansion into a Fourier series of the time domain of the present disclosure, is executed in the entire time domain in a single cycle with an assumed frequency function, the thermophysical property value is calculated through more exact analysis.

In the actual analysis, for the regression curve of Formula (8), analysis is performed using any value of n other than infinity as the upper limit of the number n of the frequency components. Nevertheless, an appropriate value of n ought to be set because, as illustrated in FIG. 7, the greater n is, the greater the convergence of the regression curve is. In the case where the sampling interval is constant, it is sufficient as long as the sample number N is taken as n.

According to the present disclosure in the above manner, the physical property value measurement device acquires a response signal that occurred in subject when an input of repetition pulse heating is applied to the subject and the physical property value is calculated by performing regression analysis on Fourier coefficients obtained when the acquired response signal is expanded into a Fourier series in relation to time, using a theoretical formula of transfer function that is the Laplace transform in relation to time of the response function by single pulse heating. In doing so, the physical property value can be accurately measured even if the subject to be measured has a multiple layer structured.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

For example, in the aforementioned embodiment, although the analysis method is described in a case where the physical property value measurement device 1 performs measurement in the FF arrangement, similarly, in the RF arrangement, analysis can be performed by the method of fitting the transfer function, which is the Laplace transform in relation to time of the response function based on a theoretical formula, to Fourier coefficients that are obtained when the acquired thermoreflectance signal is expanded into a Fourier series in relation to time.

Also, in the aforementioned Embodiment, although the physical property value measurement device 1 performs measurement of a thermophysical property value using a thermoreflectance method, any physical property value may be measured by acquiring the response signal when the pulse-type input is applied to the subject, and by fitting the transfer function, which is the Laplace transform in relation to time of the response function based on a theoretical formula, to Fourier coefficients that are obtained when the acquired response function is expanded into a Fourier series in relation to time.

An existing information terminal can also be made to function as the physical property value measurement device according to the present disclosure by installing the program that is executed by the computer 18 in the aforementioned embodiment onto the information terminal.

Further, any method may be used for distribution of such a program, and for example, the program may be stored and distributed on a computer-readable recording medium such as a compact disc read-only memory (CD-ROM), a digital versatile disc (DVD), a magneto-optical (MO) disc, a memory card, or the like, and the program may be distributed through a communication network such as a cellular phone network or the Internet.

This application claims the benefit of Japanese Patent Application No. 2017-215004, filed on Nov. 7, 2017, the entire disclosure of which is incorporated by reference herein.

REFERENCE SIGNS LIST

1 Physical property value measurement device
10 Specimen
11 Signal generator A
12 Heating laser
13 Temperature probe laser
14 Signal generator B
15 Optic modulator
16 Differential detector
17 Lock-in amplifier
18 Computer
101 Substrate
102 Thin film

What is claimed is:

1. A physical property value measurement device, comprising:
a heating laser to output a repetition pulse beam to irradiate a subject with a heating beam based on the repetition pulse beam;
a detector to detect a detection signal by photoelectric conversion of reflected light of a temperature probe beam reflected on the subject when the subject is irradiated with the temperature probe beam having a delay in light emission timing relative to the heating beam, the temperature probe beam being a repetition pulse beam of a same cycle as the heating beam; and
a computer to calculate a physical property value by performing regression analysis on Fourier coefficients obtained when a temperature response signal based on the detection signal detected by the detector is expanded into a Fourier series in relation to time, using a theoretical formula of a transfer function that is a Laplace transform in relation to time of the response function in a case of irradiation with a single pulse heating beam, with a Laplace transform coefficient into which a value obtained by multiplying by $2\pi i$ a frequency of each term in a Fourier series expansion is substituted, where $\pi$ is the circular constant and i is the imaginary unit.

2. The physical property value measurement device according to claim 1, wherein the computer calculates the physical property value by performing regression analysis, in a frequency range from a frequency of a repetition pulse beam to a sampling frequency, on the Fourier coefficients obtained when the temperature response signal is expanded into the Fourier series across an entire domain of a single cycle of repetition pulse beam.

3. The physical property value measurement device according to claim 1, wherein
the physical property value is a thermophysical property value including a thermal diffusivity, a thermal effusivity, or an interface thermal resistance of the subject.

4. The physical property value measurement device according to claim 1, wherein
the heating beam with which the subject is irradiated is modulated light that is intensity-pulse modulated to the repetition pulse beam output by the heating laser, and
the temperature response signal is an amplification signal obtained by amplifying a component that is synchronous with a frequency of the intensity-pulse modulation, the component being included in the detection signal obtained by photoelectric conversion of the reflected light when the subject is irradiated with the temperature probe beam.

5. The physical property value measurement device according to claim 1, wherein
the subject includes a substrate and a thin film deposited on the substrate, and
a temporal change of a temperature distribution of the subject is calculated based on a result of the regression analysis performed using the theoretical formula of the transfer function that is the Laplace transform in relation to time of the response function in a case of irradiation with a single pulse heating beam, and the result is displayed, as a three-dimensional graph, with a position in a through-thickness direction of the thin film and the substrate, temperature, and time, on three axes.

6. A physical property value measurement method comprising:
a heating beam irradiation step of irradiating a subject with a heating beam based on a repetition pulse beam output by a heating laser;
a response signal acquisition step of acquiring, by a computer, a temperature response signal based on a detection signal detected by a detector by photoelectric conversion of reflected light of a temperature probe beam reflected on the subject when the subject is irradiated with the temperature probe beam having a delay in light emission timing relative to the heating beam, the temperature probe beam being a repetition pulse beam of a same cycle as the heating beam; and a physical property value calculation step of calculating, by an operation unit of the computer, a physical property value by performing regression analysis on Fourier coefficients obtained when the temperature response signal acquired in the response signal acquisition step is expanded into a Fourier series in relation to time, using a theoretical formula of a transfer function that is a Laplace transform in relation to time of the response function in a case of irradiation with a single pulse heating beam, with a Laplace transform coefficient into which a value obtained by multiplying by $2\pi i$ a frequency of each term in a Fourier series expansion is substituted, where $\pi$ is the circular constant and i is the imaginary unit.

7. A non-transitory computer readable recording medium that stores a program for causing a computer to function as:

a signal acquirer to acquire a temperature response signal based on a detection signal detected by photoelectric conversion of reflected light of a temperature probe beam reflected on a subject when the subject is irradiated with the temperature probe beam having a delay in light emission timing relative to the heating beam after a heating beam based on a repetition pulse beam is irradiated, the temperature probe beam being a repetition pulse beam of a same cycle as the heating beam; and an operation unit to calculate a physical property value by performing regression analysis on Fourier coefficients obtained when the temperature response signal is expanded into a Fourier series in relation to time, using a theoretical formula of a transfer function that is a Laplace transform in relation to time of the response function in a case of irradiation with a single pulse heating beam, with a Laplace transform coefficient into which a value obtained by multiplying by $2\pi i$ a frequency of each term in a Fourier series expansion is substituted, where $\pi$ is the circular constant and i is the imaginary unit.

* * * * *